United States Patent [19]
Melian

[11] Patent Number: 5,636,262
[45] Date of Patent: Jun. 3, 1997

[54] INTERFACE SCANNING CIRCUIT

[75] Inventor: Jesus P. Melian, Madrid, Spain

[73] Assignee: Telefonica de España, S.A., Madrid, Spain

[21] Appl. No.: 365,959

[22] Filed: Dec. 29, 1994

[30] Foreign Application Priority Data

Dec. 31, 1993 [ES] Spain ..................... 9302744

[51] Int. Cl.⁶ .................. H04M 3/22; H04M 1/00; H04M 3/00; H04M 9/00
[52] U.S. Cl. .................. 379/34; 379/1; 379/22; 379/10; 379/27; 379/32; 379/24; 379/384; 379/402
[58] Field of Search ............... 379/1, 9, 10, 22, 379/24, 27, 32, 34, 399, 383, 384, 402, 412; 370/13, 17, 14

[56] References Cited

U.S. PATENT DOCUMENTS

| | | | |
|---|---|---|---|
| 4,022,978 | 5/1977 | Connell et al. | 379/384 |
| 4,864,598 | 9/1989 | Lynch et al. | 379/32 |
| 5,003,573 | 3/1991 | Agah et al. | 379/1 X |
| 5,062,131 | 10/1991 | Kanare et al. | 379/27 X |
| 5,515,417 | 5/1996 | Cotreau | 379/34 |

*Primary Examiner*—Curtis Kuntz
*Assistant Examiner*—Paul Loomis
*Attorney, Agent, or Firm*—Reid & Priest L.L.P.

[57] ABSTRACT

An interface scanning circuit includes a current source at the input to a multiplexer. The current source includes a transistor disposed between two resistors, the second one of which limits reverse current. Also provided are an attenuating network including two resistors, and a low pass filter capacitor associated with the attenuating network.

1 Claim, 1 Drawing Sheet

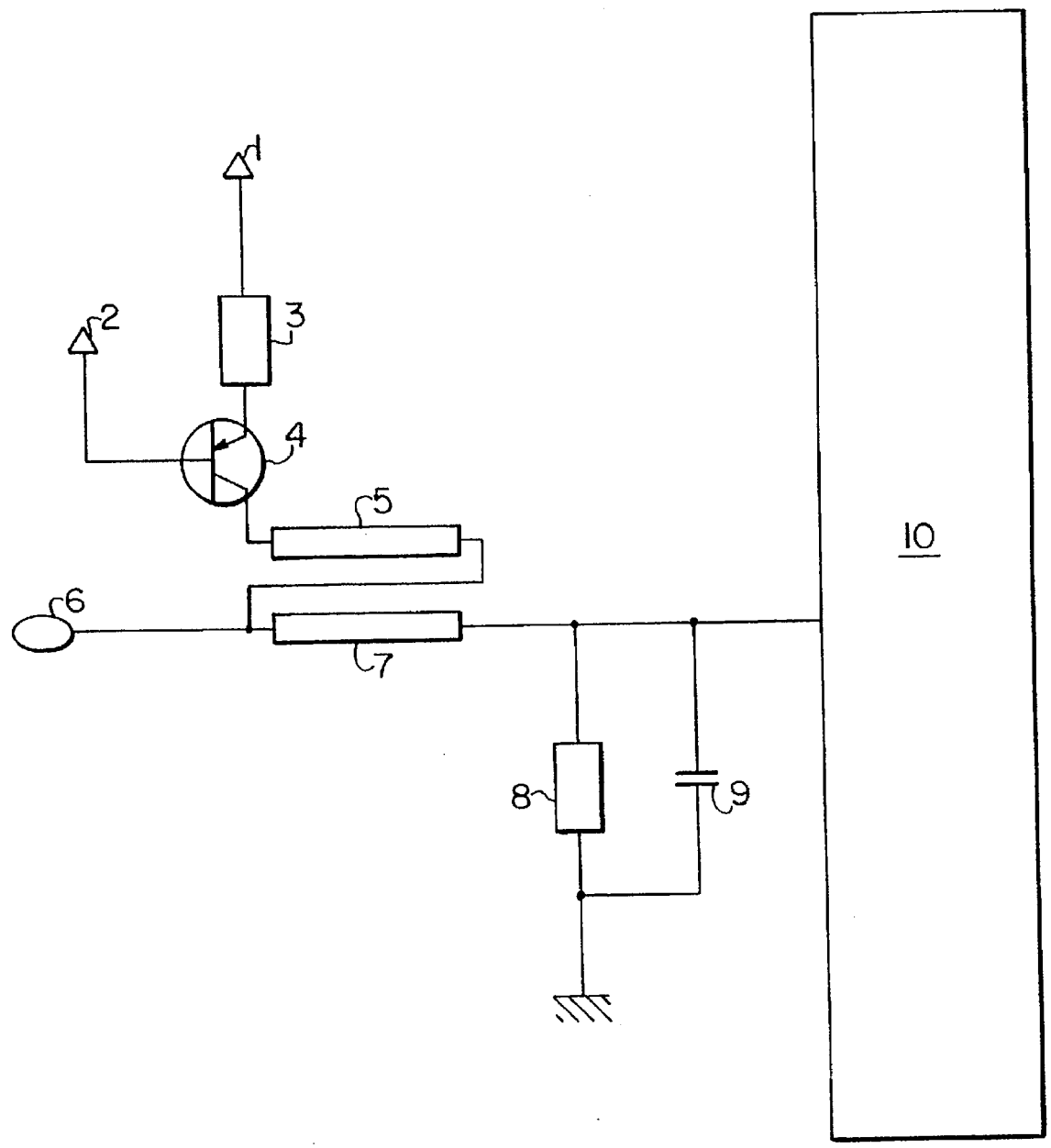

INTERFACE SCANNING CIRCUIT

BACKGROUND OF THE INVENTION

The present specification refers to a patent of invention referring to an Interface Scanning Circuit, the evident purpose of which is to be configured as a hybrid circuit, applicable to the interface scanning, specifically electronic recorders of defaults, identification of calling subscribers, and a detailed tariff of telephone stations, the object of which is to distinguish the voltage state of said interfaces.

FIELD OF THE INVENTION

This invention applies to the telecommunication field, specifically in electromechanical stations used for public telephony.

RELATED ART

In the modernization scheme of electromechanical telephone stations, the incorporation of electronic recorders in said stations is a need.

In said scheme, it is imperative, in order to identify the calling subscriber, as well as for generating a detailed tariff and its utilization on the default recorded, to use a multiplexing device of signals corresponding to scanning interfaces, being also capable of determining whether these interfaces have the established voltage or they are grounded or in the open air (open circuit).

Several known commercial circuits perform the function of checking whether a specific interface is under voltage or grounded, but, nevertheless, they do not distinguish whether said interface is under voltage, grounded or in open circuit, indistinctly.

An evident solution to the above-mentioned problem would be to rely on a circuit capable of distinguishing the three possible states, since, at present, nothing is known about the existence of a device meeting these characteristics and functions.

SUMMARY OF THE INVENTION

The interface scanning circuit as proposed by the invention, constitutes, per se, an evident novelty in the field to which is incorporated, since, starting from it and duly coupled to an electromechanical telephone station used for public telephony, it is able to distinguish the state in which the electronic recorder of defaults is, so determining whether it is under the established voltage, grounded, or in open air.

More specifically, the interface scanning circuit of the invention is configured starting from an analog multiplexor in which for each input signal there is:

A current source.

A resistor associated with the current source limiting the value of the reverse current.

An attenuating network.

A condenser associated with the attenuating network.

It should be pointed out that the current source consists of a transistor and a resistor, while the attenuating network is constituted by two resistors.

It is also to be noted that the condenser associated with the attenuating network constituted by two resistors is designed to filter the transients which could be possibly present at the attenuating network input.

The function of the circuit of the invention is to analogically multiplex a series of signals corresponding to the scanning interfaces in the defaults recorder environment, by detecting if each of said interfaces is under voltage, grounded or in the air.

The interface scanning circuit, as already mentioned, is composed of as many current sources as interfaces to be scanned, and its function is to generate a constant and independent current from the variations which possibly could exist in its feeding voltage.

The attenuators, in an amount which is similar to the amount of interfaces to be scanned, perform the necessary change of level for sending signals to the multiplexer carrying out a multiplexing at the output signal.

So, in addition to the multiplexing, the range of the voltage delivered to the system is significantly inferior, cancelling the presence of bounces in the delivered voltage owing to its function of low pass filter.

BRIEF DESCRIPTION OF THE DRAWINGS

In order to complement this description and to aid to a better understanding of the features of the invention, the accompanying drawings, which are a part of this specification, show in an illustrative but non limitative sense, the following:

The only FIGURE shows a block diagram of the interface scanning circuit of the invention, in which, in order to simplify the graphic illustration, a single scanning interface is shown.

DETAILED DESCRIPTION OF A PREFERRED EMBODIMENT

From the only FIGURE, it can be seen that the interface scanning circuit is constituted, in principle, by a multiplexer of two by eight analog signals, giving two outputs, each of the input signals being associated with a current source and an attenuating network.

According to the only FIGURE in which only one of the input lines to multiplexer (10) corresponding to the scanning interface (6) (since the other input signals are similar), is illustrated, the feeding voltage of the current source (assembly formed by a resistor (3) and a transistor (4)) is on the order of between 140 and 160 volts.

This current source has an external reference voltage between pins (1) and (2) of the hybrid circuit, the value of which is about 2.5 volts, generating an independent and constant current from the variations which could exist in its feeding voltage.

The resistor (5), which is connected to the transistor manifold (4), protects it by limiting the value of the reverse current when a transitory voltage having a positive value between the scanning interface (6) and ground appears.

The attenuating network (composed of resistors (7) and (8)) performs a change of level, so that a signal varying within a voltage range of −80 V to +80 V converts into the same signal, but with a − voltage range on the order of between −2.5 and +2.5 volts.

Likewise, each attenuating network brings in it, at its output, a capacity (9) filtering any transitory voltage which could be in this range and appearing at its input.

When a scanning interface is in the air, on the output terminals of its corresponding attenuating network, there is a level of continuous voltage comprised between 2.835 V and 3.465 V, with which, this state differs from that "grounded".

That description, already exposed and which corresponds to one of the multiplexer inputs, can be extended to several inputs, a device multiplexing sixteen input analog signals in two output—analog signals being provided in this practical embodiment, the levels of the input signals being positive and negative.

The level of the output signal is compatible with CMOS fed at +5 volts, ground referenced.

It is not considered necessary to extend more this description for an expert in the art to understand the scope of the invention and the advantages derived from it.

The materials, shape, size and arrangement of the components are open to variation, provided that it does not imply any alteration to the essence of the invention.

The terms under which this specification has been described—should be always taken in a wide and non limitative sense.

I claim:

1. An interface scanning circuit which receives scanning interface input signals, the circuit comprising:

a) an analog multiplexer; and
b) a current source, the current source including:
   b1) a first resistor;
   b2) a transistor coupled to the first resistor;
   b3) a second resistor means, coupled to the transistor, for limiting a value of reverse current;
   b4) an attenuating network, coupled to the second resistor, and including third and fourth resistors; and
   b5) a low-pass filter capacitor coupled to the attenuating network.

* * * * *

UNITED STATES PATENT AND TRADEMARK OFFICE
CERTIFICATE OF CORRECTION

PATENT NO. : 5,636,262
DATED : June 3, 1997
INVENTOR(S) : Jesus PEÑA MELIAN

It is certified that error appears in the above-indentified patent and that said Letters Patent is hereby corrected as shown below:

On title page, item
 [75], please delete the inventor's name "Jesus P. Melian" and replace with --Jesus PEÑA MELIAN--

Signed and Sealed this

Fourth Day of November, 1997

*Attest:*

BRUCE LEHMAN

*Attesting Officer*  *Commissioner of Patents and Trademarks*